(No Model.)
F. L. SENOUR.
COMBINED POTATO AND CORN PLANTER.

No. 330,158. Patented Nov. 10, 1885.

Witnesses.
Chas. R. Burr.
A. J. Stewart.

Inventor.
Frank Leroy Senour
by Franck D. Johns
his Attorney.

(No Model.) 3 Sheets—Sheet 2.

F. L. SENOUR.
COMBINED POTATO AND CORN PLANTER.

No. 330,158. Patented Nov. 10, 1885.

(No Model.) 3 Sheets—Sheet 2.

F. L. SENOUR.
COMBINED POTATO AND CORN PLANTER.

No. 330,158. Patented Nov. 10, 1885.

Witnesses.
Chas. R. Burr
A. S. Stuart

Inventor.
Frank Leroy Senour
by Franck D. Johns
his Attorney.

UNITED STATES PATENT OFFICE.

FAUNT LEROY SENOUR, OF NEW ALEXANDRIA, PENNSYLVANIA.

COMBINED POTATO AND CORN PLANTER.

SPECIFICATION forming part of Letters Patent No. 330,158, dated November 10, 1885.

Application filed April 15, 1885. Serial No. 162,308. (No model.)

*To all whom it may concern:*

Be it known that I, FAUNT LEROY SENOUR, a citizen of the United States, residing at New Alexandria, in the county of Westmoreland and State of Pennsylvania, have invented certain new and useful Improvements in a Combined Potato and Corn Planter; and I do hereby declare the following to be a full, clear, and exact description of the invention, such as will enable others skilled in the art to which it appertains to make and use the same.

My invention relates to certain improvements in combined potato and corn planters, which can be used to plant either potatoes or corn.

It consists in certain novelty of construction and arrangement of the various parts, all of which I will now proceed to point out and describe, reference being had to the accompanying drawings, in which—

Figure 1:
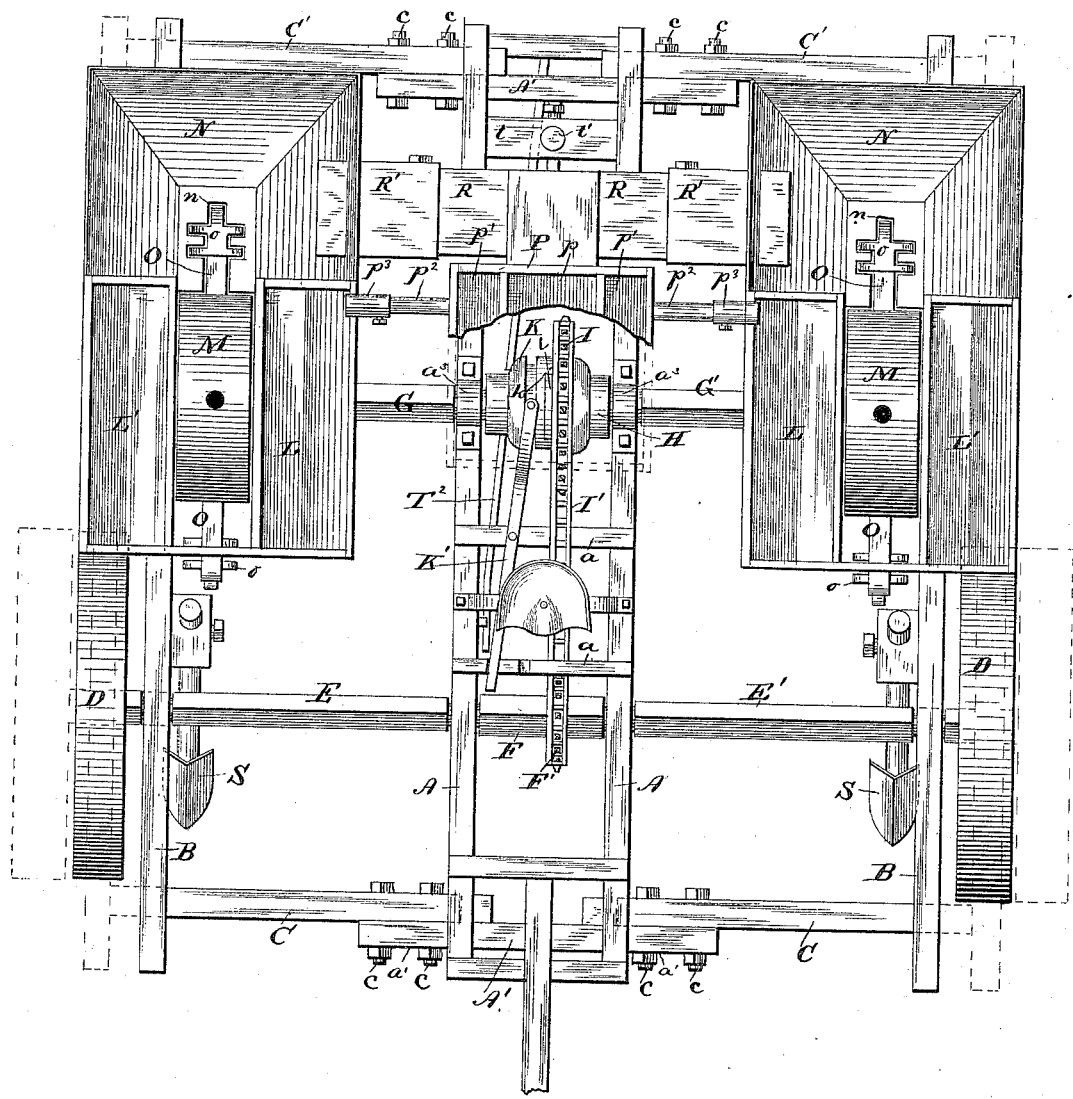
Figure 2:
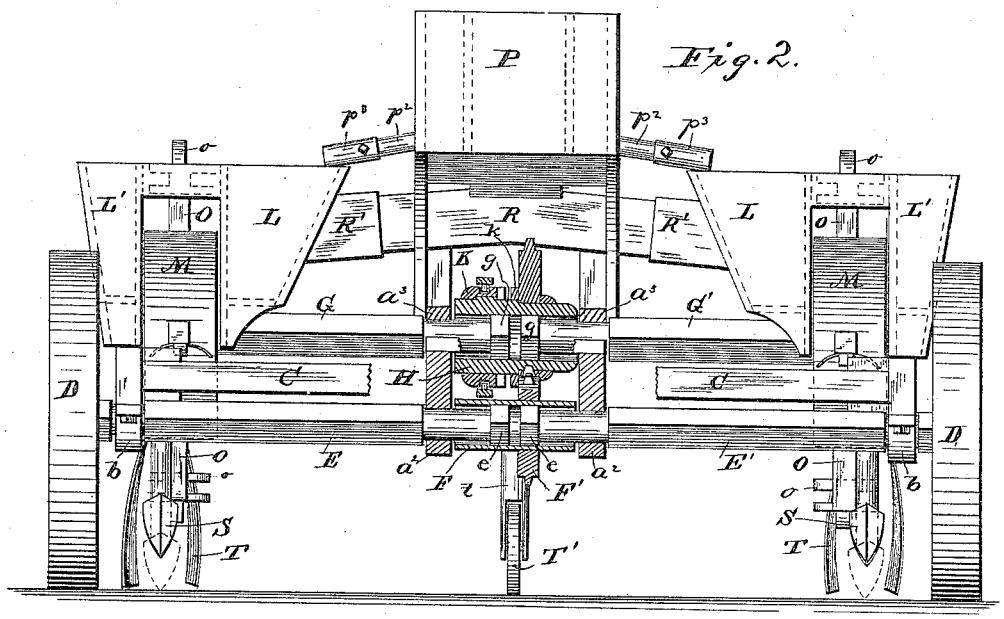
Figure 3:
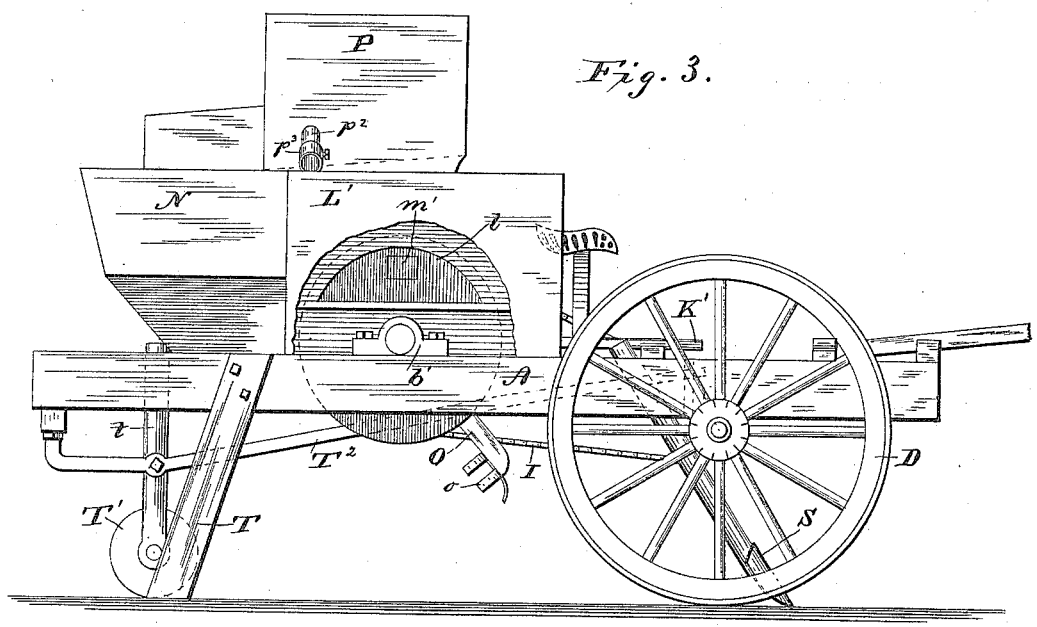
Figure 2:
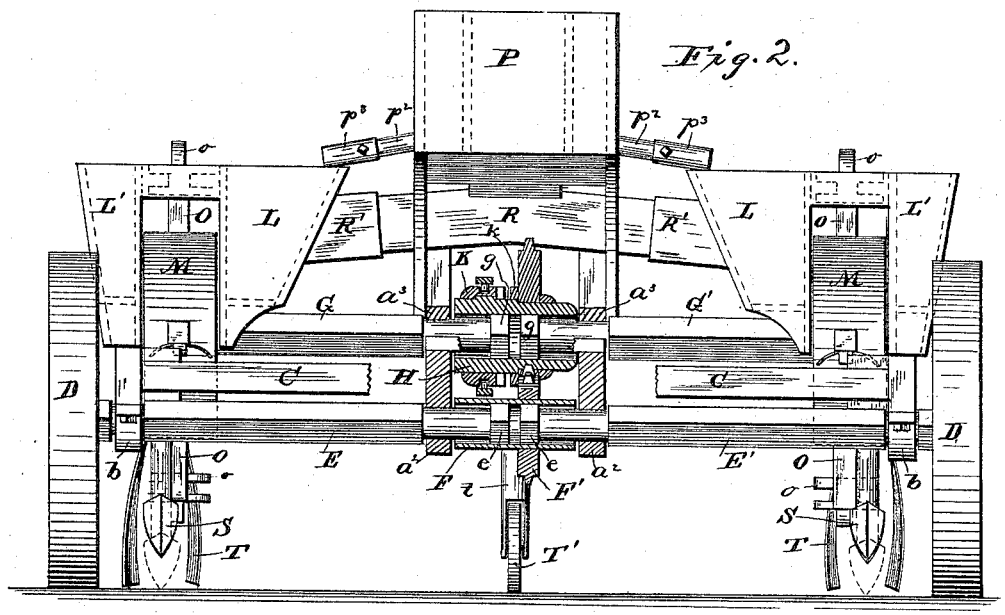
Figure 3:
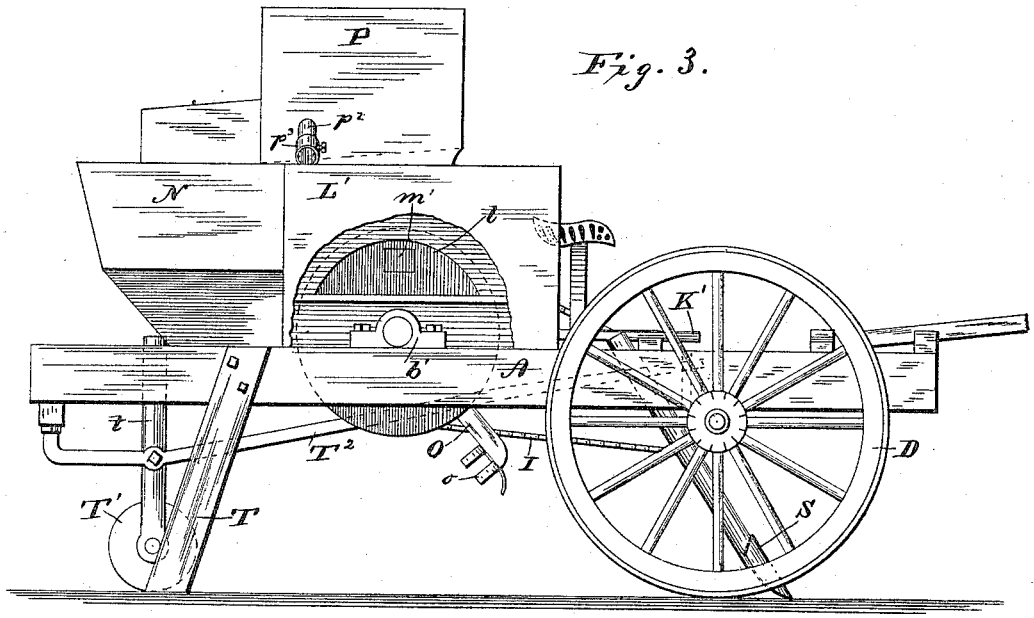

Figure 1 is a top plan view; Fig. 2, a front elevation, partly in section; Fig. 3, a side elevation; Fig. 4, a detail showing the construction of the hopper and seed-wheel. Figs. 5, 6, and 7 are details.

Referring to said drawings, A A are two longitudinal center bars of the frame of the machine carrying the operating mechanism, and held together by suitable cross-bars, A' A', and braces $a$.

B B are the side bars.

C C and C' C' are cross-bars rigidly secured to the ends of the bars B B, and projecting in through the slots $a'$ in the center bars, A A, are secured to the bars A' A' by bolts $c$. The frame can be adjusted to any desired width by removing the bolts $c$ and moving the cross-bars C C' in or out as it is desired to narrow or widen the distance apart of the rows.

D D are the supporting and driving wheels, mounted upon an axle formed in two sections, E E'. One wheel is keyed to the axle. The other is mounted loosely upon the same. The outer ends of said axle-sections are journaled in suitable bearings, $b$ $b$, on the side bars, B B, the inner ends being journaled in the bearings $a^2 a^2$ on the center bars, A A. The inner ends of the axles are provided with rectangular-shaped shoulders or ends $e$ $e$, which project beyond the bearings $a^2 a^2$ and enter a rectangular sleeve, F, located between the center bars, A A. Said axle-sections are adjustable longitudinally in said sleeve as the frame is adjusted, and said sleeve is keyed to the axle-sections by the rectangular beads $e$ $e$ and revolves with said axle. F' is a sprocket-wheel mounted on the sleeve F.

G G' are sections of a shaft carrying the seed-dropping devices, and mounted in suitable bearings, $b'$ $b'$ and $a^3$ $a^3$. The inner ends of said sections G G', projecting beyond the bearings $a^3 a^3$, are provided with rectangular shoulders $g$ $g$, which enter a rectangular opening extending through the sleeve H, and key the same to said shaft-sections, causing them to revolve with it. The ends of the shaft-sections are adjustable longitudinally in the sleeve. It will be seen that the shaft-sections G G' are also adjustable with the frame.

Mounted loosely on the sleeve H is a sprocket-wheel, I, having cam projections $i$ on its side.

I' is an endless chain connecting the wheels I and F', and by means of which motion is imparted to the wheel I.

Keyed to the sleeve H, and movable laterally on the same, is a collar, K, provided with suitable cam projections, $k$, by means of which the machine is thrown in or out of gear as said collar K engages with the wheel I and locks it to the sleeve.

K' is a lever for operating the collar to throw the planter in or out of gear.

L L' are seed and fertilizer hoppers.

M are seed and fertilizer distributing wheels mounted on the shafts G G', and provided with suitable seed and fertilizer cups on their opposite sides, as hereinafter described. Said wheels M fit snugly in between the seed and fertilizer hoppers, and through the openings or valves $l$ in the lower part of the sides of said hoppers. The fertilizer is placed in the inner hoppers, L, and the seed in the outer hoppers, L'.

N are potato-hoppers located back of the seed-hoppers. Said hoppers N are provided with wide flaring sides to prevent the potatoes from becoming jammed in the hopper.

In the periphery of the seed-wheels are secured removable lifting-arms O, having on their outer ends the fingers $o$. Said fingers are sufficiently close together to hold a potato or piece of potato. The arms O may be secured directly to the shaft, if desired. As the shaft revolves, the arms O and fingers o alternately come under the potato-hoppers, and, passing up through slots n in the bottom of the hoppers N, lift a piece of potato out of the hopper, carrying it between the seed and fertilizer hoppers, letting said potato fall to the ground as the arm starts on the downward portion of its revolution. Said slots n correspond to the shape of the fingers o, and are sufficiently large to permit said fingers to pass through the same, but not large enough to permit a seed-potato to fall out after the arm and fingers have moved up out of the hopper, thus doing away with the necessity of valves or other devices for closing said openings.

The arms O may be secured to the seed-wheel in any suitable manner, preferably by providing the same with a screw-threaded end, which enters a threaded hole in the periphery of the wheel. Any desired number of arms may be used. In the drawings only two are shown, and these are located diametrically opposite each other.

P is a main supply-hopper secured to the center bars, A A, and is provided with three compartments—a center one, $p$, for potatoes, and side compartments, $p'$ $p'$, for fertilizing material, which is fed to the fertilizer-distributing hoppers by pipes $p^2$, having adjustable extensions $p^3$, by means of which the pipes can be lengthened or shortened as the width of the frame is changed.

The potatoes are fed to the potato-hoppers by chutes R, having adjustable extensions R'.

S are adjustable plows or furrow-openers, having their shanks mounted in slotted blocks secured to the side bars, and are held in position by set-screws.

T are coverers secured to the rear part of the frame.

T' is a pony-wheel secured to a standard, $t$, which is adjustable in a bearing, $t'$, on the rear of the frame.

$T^2$ is a lever connected to the standard $t$, by means of which the wheel T' is raised or lowered. The end of the lever extends out to the driver's seat. This wheel is of great use to regulate the depth the seed is covered, also to raise the coverers from the ground when turning at the end of a field.

The seed and fertilizer distributing wheels M are provided on their opposite faces with any desired number of recesses, $m$, directly opposite each other. Each recess is provided with a correspondingly-shaped removable block, $m'$, which fits snugly in said recess, and is secured by suitable screws. On the side of the wheel which communicates with the seed-hopper the blocks $m'$ are provided with a blank face, $m^2$, and faces $m^3$, having a different number of seed-cups $m^4$ on each face. Each seed-cup in the construction shown is made just large enough to hold a single grain of corn. They may, however, be made larger, if desired. By this arrangement the operator is able to regulate the number of grains of corn he will plant, and the distance apart the seed is to be dropped. If it is desired to plant at each revolution of the seed-wheel, place all the blocks $m'$ in their recesses, with the blank faces out, except one, and turn the face out on this block that has the desired number of seed-cups upon the same. To plant at each half-revolution, turn faces having the desired number of seed-cups out on two blocks diametrically opposite each other. To plant at the quarter-revolution, turn the seed-cups out on all the blocks. In the drawings only four recesses are shown. More may be made, if desired. On the opposite side of the wheel all the faces of the blocks $m^5$ are made blank, and the recesses are used as the cups which receive and distribute the fertilizer, said recesses having their edges near the periphery of the wheel beveled and sloping out, so that the fertilizer readily falls out of the same as the wheel revolves.

The fertilizer recesses or cups are made directly opposite the seed-cups, and to distribute the fertilizer so that it will fall at the same point as the seed remove the block in the recess opposite the seed-cup which is in use, and let all the other blocks remain in place. Fertilizing material will then be dropped at the same time the cup on the opposite side of the wheel discharges seed.

Having thus fully described my invention, I claim as new and desire to secure by Letters Patent—

1. In a planter such as described, the combination of a laterally-adjustable frame, a rotating supporting-axle formed in two sections keyed at their inner ends to a connecting-sleeve, and adjustable longitudinally in said sleeve, a shaft carrying the seed-dropping devices, and formed in two sections keyed at their inner ends to and adjustable longitudinally in a connecting-sleeve, said sleeve being connected by intermediate mechanism, as described, with the rotating axle, all arranged and operating substantially as and for the purpose set forth.

2. In a potato-planter, a rotating shaft provided with lifting-arms O, having fingers o on their outer ends, in combination with the hopper N, having slots n in its bottom corresponding to the shape of the fingers o, and through which slots the fingers pass as the arms O revolve, all arranged and operating substantially as and for the purpose shown and described.

3. In a potato-planter having a laterally-adjustable frame, a main supply-hopper provided with chutes R, having adjustable extensions R', the distributing-hoppers N, having slots n in their bottoms, in combination with a rotating shaft, lifting-arms O, secured to the shaft and provided with fingers o on their outer ends, all arranged and operating substantially as and for the purpose set forth.

4. In a planter such as described, having a laterally-adjustable frame, supply-hoppers $p'$, provided with pipes $p^2$, having extensions $p^3$, and the distributing-hoppers L L', in combination with a rotating distributing-wheel having cups on its side faces, substantially as shown and described.

5. In a planter such as described, the combination of the hoppers L L', rotating seed and fertilizer distributing wheels M, having cups on their side faces, the lifting-arms O, secured to the periphery of the wheels M, and having fingers o on their outer ends, and the hoppers N, having slots n in their bottoms, all arranged and operating substantially as shown and described.

6. In a planter, a vertically-rotating seed-distributing wheel having recesses $m$ on its side, and provided with the removable blocks $m'$, having blank faces $m^2$, and faces $m^3$, having a different number of seed-cups $m^4$ on each face, substantially as and for the purpose shown and described.

7. In a planter, a vertically-rotating seed and fertilizer distributing wheel provided on one side with fertilizer recesses or cups, having removable blocks $m^5$ fitting in and completely filling said recesses, and correspondingly-located recesses on the opposite side of said wheel, provided with removable blocks $m'$, having blank faces $m^2$, and faces $m^3$, having a different number of seed-cups on each face, substantially as and for the purpose shown and described.

In testimony whereof I affix my signature in presence of two witnesses.

FAUNT LEROY SENOUR.

Witnesses:
J. R. SNIVELY,
A. R. MURPHY.